United States Patent
Harms et al.

(10) Patent No.: US 10,023,387 B2
(45) Date of Patent: Jul. 17, 2018

(54) CARGO HANDLING SYSTEM

(71) Applicant: GOODRICH CORPORATION, Charlottle, NC (US)

(72) Inventors: Scott Harms, Ypsilanti, ND (US); Walace Harold Larson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/637,141

(22) Filed: Jun. 29, 2017

(65) Prior Publication Data

US 2017/0297821 A1   Oct. 19, 2017

Related U.S. Application Data

(62) Division of application No. 14/801,596, filed on Jul. 16, 2015, now Pat. No. 9,694,978.

(51) Int. Cl.
| | |
|---|---|
| *B65G 13/06* | (2006.01) |
| *B65G 13/075* | (2006.01) |
| *H02P 3/22* | (2006.01) |
| *H02P 3/02* | (2006.01) |
| *H02K 26/00* | (2006.01) |
| *H02K 1/27* | (2006.01) |
| *H02K 1/08* | (2006.01) |
| *B65G 13/071* | (2006.01) |
| *B64D 9/00* | (2006.01) |
| *H02K 15/00* | (2006.01) |

(52) U.S. Cl.
CPC ............ *B65G 13/075* (2013.01); *B64D 9/00* (2013.01); *B65G 13/071* (2013.01); *H02K 1/08* (2013.01); *H02K 1/278* (2013.01); *H02K 15/0006* (2013.01); *H02K 26/00* (2013.01); *H02P 3/025* (2013.01); *H02P 3/22* (2013.01); *B64D 2009/006* (2013.01)

(58) Field of Classification Search
None
See application file for complete search history.

(56) References Cited

U.S. PATENT DOCUMENTS

| | | |
|---|---|---|
| 3,902,583 A | 9/1975 | Laibson |
| 5,183,150 A | 2/1993 | Chary et al. |
| 6,051,133 A | 4/2000 | Huber |

(Continued)

FOREIGN PATENT DOCUMENTS

| | | |
|---|---|---|
| EP | 263540 B1 | 10/1990 |
| EP | 1371582 | 12/2003 |
| WO | 2004107531 | 12/2004 |

OTHER PUBLICATIONS

Extended European Search Report dated Jan. 31, 2017 in European Application No. 16179969.7.

(Continued)

*Primary Examiner* — William Ray Harp
(74) *Attorney, Agent, or Firm* — Snell & Wilmer, L.L.P.

(57) ABSTRACT

Disclosed is a powered transport cargo system, and a method of retrofitting a powered transport cargo system that includes braking rollers. The method includes replacing a power drive unit (PDU) of the powered transport cargo system with a PDU including a permanent magnet motor (PMM), and removing a braking roller from the powered transport cargo system.

9 Claims, 7 Drawing Sheets

(56) References Cited

U.S. PATENT DOCUMENTS

| | | |
|---|---|---|
| 6,148,967 A | 11/2000 | Huynh |
| 6,653,806 B1 | 11/2003 | Ono |
| 6,834,758 B2 | 12/2004 | Nguyen et al. |
| 7,014,038 B2 | 3/2006 | Leingang et al. |
| 7,673,738 B2 | 3/2010 | McConnell |
| 8,179,063 B2 | 5/2012 | Hahle |
| 9,889,990 B2 * | 2/2018 | Dimitrov ............. B65G 13/075 |
| 2003/0184178 A1 | 10/2003 | Bousche |
| 2011/0025156 A1 | 2/2011 | Groening et al. |
| 2014/0245666 A1 | 9/2014 | Ishida et al. |
| 2016/0130089 A1 | 5/2016 | Dimitrov |
| 2017/0015503 A1 | 1/2017 | Harms et al. |

OTHER PUBLICATIONS

Notice of Allowance dated May 3, 2017 in U.S. Appl. No. 14/801,596.
First Office Interview—Office Action dated Nov. 23, 2016 in U.S. Appl. No. 14/801,596.
Preinterview First Office Action dated Sep. 27, 2016 in U.S. Appl. No. 14/801,596.

* cited by examiner

CARGO HANDLING SYSTEM

CROSS REFERENCE TO RELATED APPLICATION

This application is a divisional application of and claims priority to U.S. patent application Ser. No. 14/801,596, titled "CARGO HANDLING SYSTEM", which was filed on Jul. 16, 2015. The aforementioned application is hereby incorporated by reference herein in its entirety.

BACKGROUND

Cargo handling systems, such as those used by aircraft for transport of heavy containerized cargo or pallets, (also referred to as unit load devices (ULDs)) typically include roller trays containing transport rollers which rollably support the cargo, and a power drive unit (PDU) for facilitating loading and unloading operations.

Conventionally, braking function may be provided in the PDU and/or by adding braking rollers to the trays. To achieve braking function in the PDU, solenoid brakes may be utilized. However, solenoid brakes are typically biased to engage or alternatively disengage in a power-off state, with typical systems being designed to lose braking function in the power-off state.

Accordingly, such cargo handling systems typically utilize additional braking rollers to provide braking force in the power-off state. Therefore, in typical lower deck applications, which may contain between about 48 to 64 PDUs, the number of braking rollers may equal about 70% of the number of PDUs. Such braking rollers may react with a braking force in one or both directions, and may impose undesired resistance in normal operation. Additionally, such braking rollers take up space that may otherwise be utilized for transport rollers or restraint devices in the system.

SUMMARY

In accordance with various embodiments, disclosed is a cargo handling system, and a power drive unit (PDU) for a cargo handling system, wherein the PDU comprises a permanent magnet motor (PMM). According to various embodiments the PDU is designed to provide a first braking function for a static state which is a static restraint braking function effectuated by designing the PMM to have a high cogging torque; and a second braking function for a dynamic state which is a dynamic control braking function effectuated by motor regeneration. Thus, the PDU may allow for substantially reducing or eliminating braking rollers from cargo handling system.

In accordance with various embodiments, disclosed is a cargo handling system comprising a power drive unit (PDU), said PDU comprising a permanent magnet motor (PMM) having a power drive function, a first braking function, and a second braking function; and a wheel component in power driving engagement with said PMM, wherein said first braking function comprises a static restraint braking function, and said second braking function comprises a dynamic control braking function.

According to one embodiment, the PMM has a cogging torque of at least 16 ounce inch. According to one embodiment, the PMM has an output torque of at least 76 ounce inches. According to yet another embodiment, said second braking function comprises regenerative braking. According to yet another embodiment, the cargo handling system of claim further comprises a tray comprising a plurality of transport rollers supported on said tray, and retaining said PDU. According to yet another embodiment, the cargo handling system further comprises a cargo restraint device in said tray. According to yet another embodiment, the PMM comprises a magnet component including a magnet pole arc of approximately between 120 and 160 electrical degrees. According to one embodiment, the PMM comprises a magnet component including a magnet pole arc of approximately 140 electrical degrees.

According to one embodiment, the second braking function is triggered when the cargo handling system is in a powered off state.

According to one embodiment, the PMM comprises a resistance load effectuating said second braking function. According to another embodiment, the second braking function comprises a linear increasing force or a non-linear increasing force.

According to various embodiments, disclosed is a power drive unit (PDU), comprising: a permanent magnet motor (PMM) including a power drive function, a first braking function, and a second braking function; and a wheel component in power driving engagement with said PMM, wherein said first braking function comprises a static restraint braking function, and said second braking function comprises a dynamic control braking function. According to one embodiment, the PMM has a cogging torque of at least 16 ounce inch. According to one embodiment, the PMM has an output torque of at least 76 ounce inches. According to one embodiment, said second braking function comprises regenerative braking. According to one embodiment, the PMM comprises a magnet component including a magnet pole arc of approximately between 120 and 160 electrical degrees. According to one embodiment, the PMM comprises a resistance load effectuating said second braking function. According to yet another embodiment, said second braking function comprising a linear increasing force or a non-linear increasing force.

According to various embodiments, disclosed is a method of retrofitting a powered transport cargo system comprising braking rollers, the method comprising: replacing a power drive unit (PDU) of the powered transport cargo system with a PDU including a permanent magnet motor (PMM); and removing a braking roller from the powered transport cargo system. According to one embodiment, the method further comprises replacing said braking roller with at least one of a transport roller or a cargo restraint device.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the disclosure, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
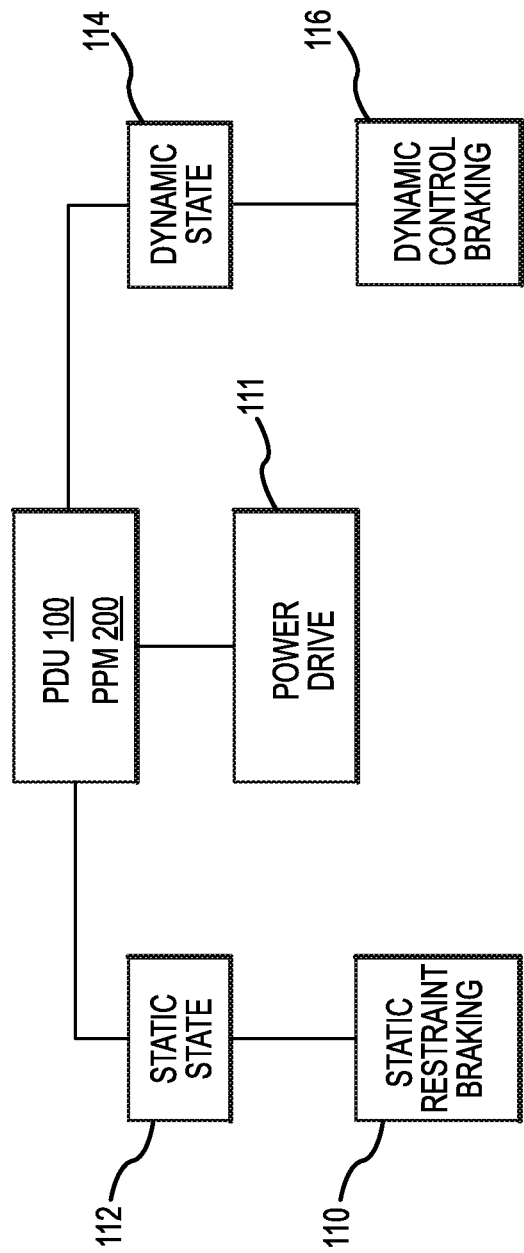
FIG. 1A is a flow chart showing braking functionality of a Power Drive Unit (PDU) incorporating a permanent magnet motor (PMM), in accordance with various embodiments.
Figure 1B:
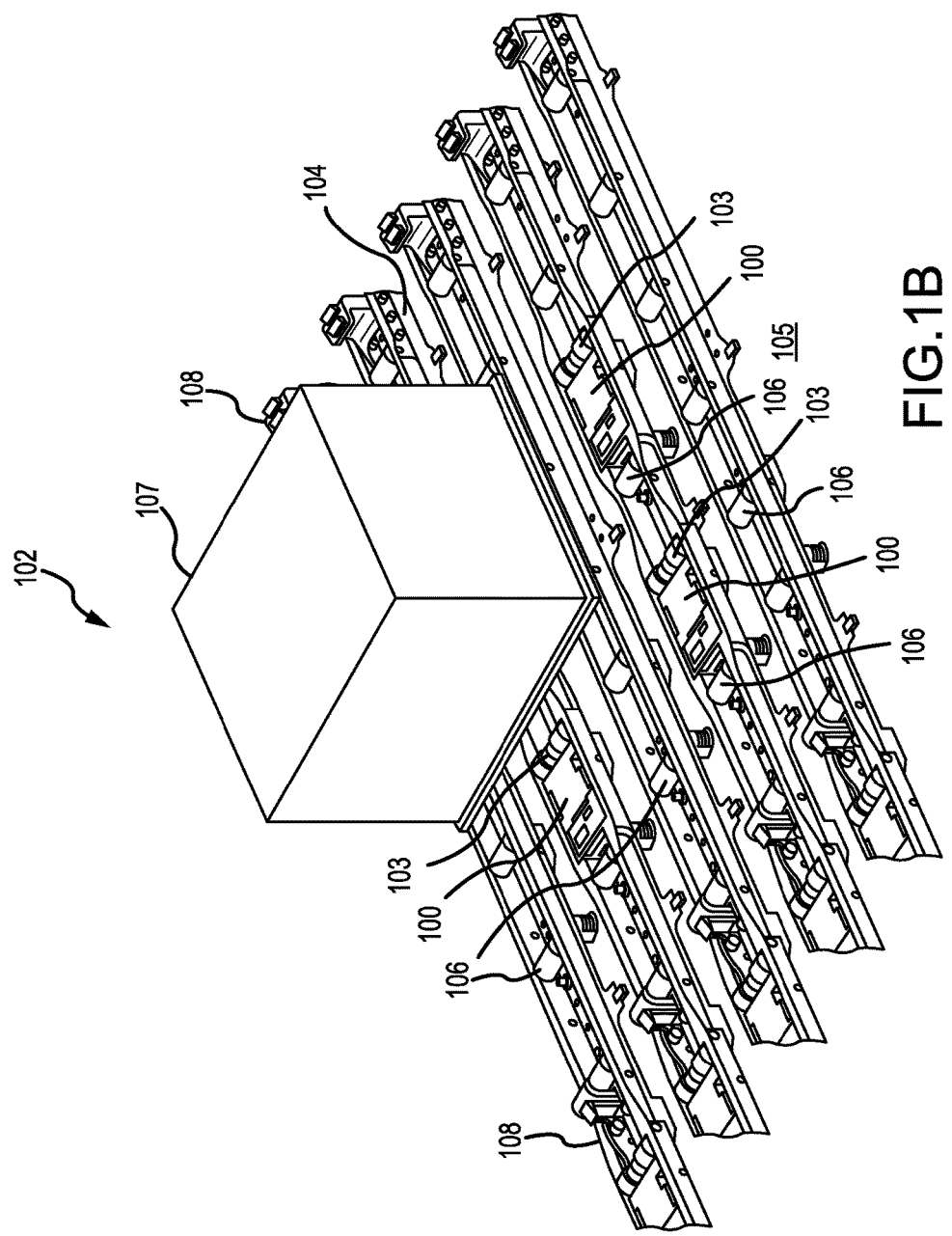
FIG. 1B shows a cargo handling system incorporating the PDU of FIG. 1A, according to various embodiments.

According to various embodiments, and with reference to FIGS. 1A and 1B, disclosed is a cargo handling system 102, and a power drive unit (PDU) 100 for a cargo handling system 102, wherein PDU 100 comprises a permanent magnet motor (PMM) 200 in power driving engagement with a wheel component 103 through, for example, a gear train assembly. According to various embodiments, PDU 100 comprising PMM 200 is designed to provide a first braking function 110 for a static state 112, which is a static restraint braking function effectuated PMM 200's high cogging torque, and a second braking function 116 for a dynamic state 114 which is a dynamic control braking function effectuated by motor regeneration ("dynamic braking function" or "regenerative braking"), in addition to its primary power driving function 111. Thus, PDU 100 comprising PMM 200 may allow for substantially reducing or eliminating braking rollers from cargo handling system 102.

Cargo handling system 102, comprising PDU 100, is illustrated in FIG. 1B, in accordance with various embodiments. According to various embodiments, cargo handling system 102 comprises a cargo system platform 105, which supports trays 104. Each tray 104 supports a plurality of transport rollers 106 and retains at least one PDU 100 including wheel component 103 in each tray 104. Trays 104 are configured to support cargo 107, which is typically containerized in pallets or ULDs. According to various embodiments, trays 104 of cargo handling system 102 contain no braking rollers. According to various embodiments, cargo handling system 102 may comprise a plurality of spaced apart trays 104 positioned longitudinally throughout cargo system platform 105. According to various embodiments, cargo handling system 102 may configured to transport cargo 107 at a transport speed of approximately between 45 feet per minute to 60 feet per minute (0.23 m/s to 0.30 m/s). Additionally, cargo handling system 102 may include cargo restraint devices 108 in trays 104, such as end stops, and the like. As will be apparent to one skilled in the art, the size and operational parameters of cargo handling system 102, including operating transport speed, number of trays, rollers, and PDUs, etc. may vary depending on the type of aircraft, operational conditions and requirements, etc.

Cargo handling system 102 may be employed for powered transport of cargo, typically heavy cargo, typically in lower deck aircraft operations, typically by wide body aircraft, but may also be employed in main deck operations, by smaller aircraft, according to various embodiments.

Figure 1C:
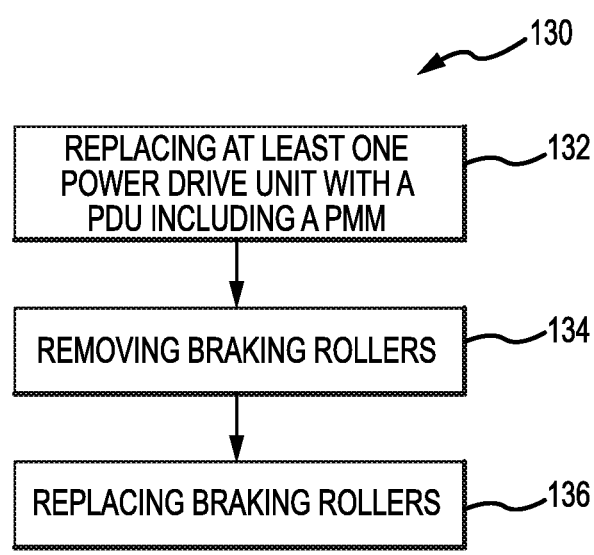
FIG. 1C shows a method of retrofitting a conventional powered transport cargo system including braking rollers, according to various embodiments.

FIG. 1C illustrates a method of retrofitting 130 a powered transport cargo system including braking rollers, according to various embodiments. The method 130 comprises replacing at least one power drive unit 132 with a PDU including a PMM. The method 130 further comprises removing at least some of the braking rollers 134. The method further comprises replacing a portion or all of the braking rollers 136 with transport rollers and/or cargo restraint devices.

According to various embodiments, PMM 200 is designed to have a cogging torque sufficient to effectuate first braking function 110 or the static restraint braking function in static state 112. In static state 112, PMM 200, and wheel component 103, are generally stationary, which may be the case, for example, when power has been removed (e.g. in a power failure and/or manual loading operations, or when the system is not being used). In static state 112 first braking function 110 may be required to prevent a stationary or nearly stationary container positioned upon rollers 106 of the tray 104 from moving. For example, a container may start sliding due to tilting of the cargo platform, an undone restraint, etc. Typically, first braking function 110 is useful in a power off state caused by, for example, power failure and/or manual loading operations, according to various embodiments. Accordingly, the PDU 100 will hold a container starting to move in place.

Figure 2:
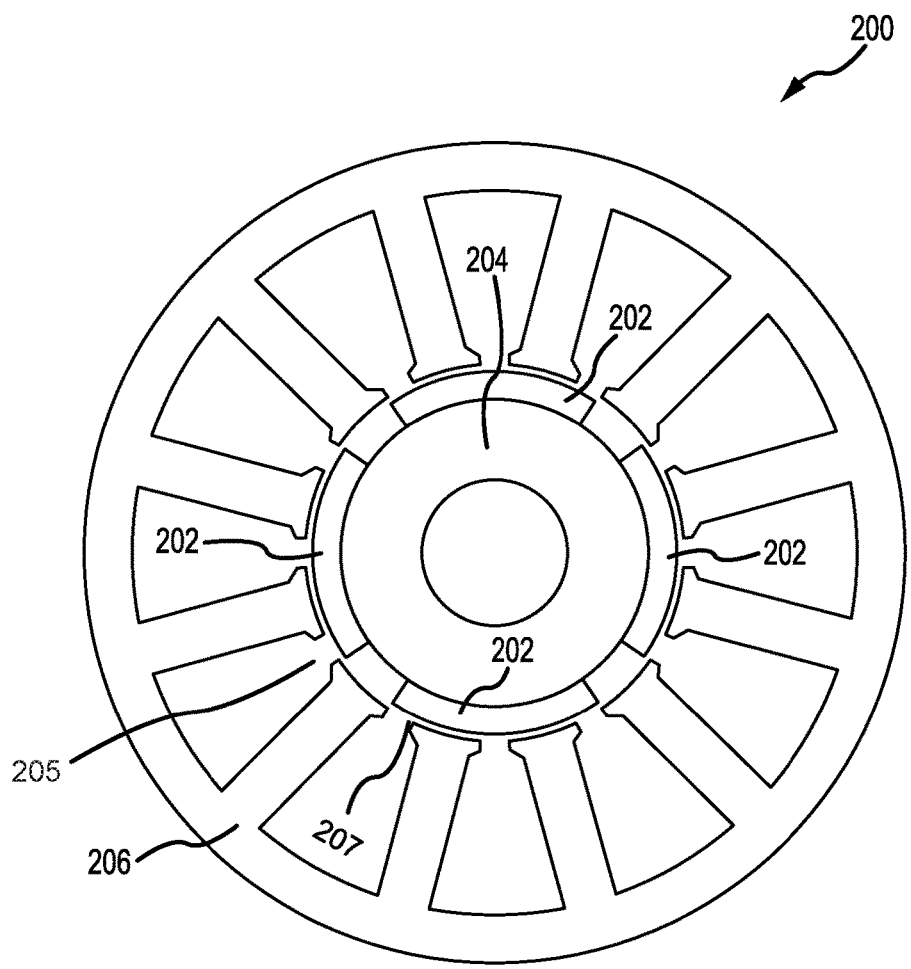
FIG. 2 is a sectional view of a PMM, according to various embodiments.

FIG. 2 is a cross section of a PMM 200 in accordance with various embodiments, generally comprising a magnet component 202, a rotor 204, and a stator component 206. According to various embodiments, PMM 200 is designed to have a high cogging torque (i.e at least 16 ounce inches (113 Nm)). Cogging torque of electrical motors is the torque due to the interaction between the permanent magnets of the rotor and the stator slots of a PMM. Typically, cogging torque is an undesirable component for the operation of a PMM. It is especially prominent at lower speeds, and is associated with jerkiness. Cogging torque results in torque as well as speed ripple; however, as at high speed the motor moment of inertia filters out the effect of cogging torque, while maintaining a functional motor output torque. According to various embodiments, PMM 200 has a cogging torque of at least 16 ounce inches (113 Nm), and a motor output torque of at least 76 ounce inches (536 Nm). According to various embodiments, the desired parameters are achieved by adjusting the machine inductance as a function of rotor angle. According to various embodiments, the magnet pole arc (arc length of the magnetic pole) of magnet component 202 may be adjusted to meet these parameters.

Simulated studies on the effect of arc length on cogging torque and motor output torque values show that while the cogging torque is increased with arc length, the motor output torque is decreased, indicating a general trade off between the motor output torque and cogging torque. Thus, magnet component 202 may be designed with a magnet pole arc of about between 120 and 160 electrical degrees, and, in various embodiments, about 140 electrical degrees. Further simulated studies adjusting other parameters such as the slot opening 205 and air-gap 207 between the rotor and stator with the magnetic arc to effectuate a desired cogging torque and motor output values found magnet component 202 of PMM 200 may be designated at about 137 electrical degrees, with a slot opening 205 of about 0.06 inches (0.152 cm), and air gap 207 of about 0.014 inches (0.036 cm), according to various embodiments.

Additionally, the effective cogging resistance, which is the resistance produced at wheel component 103 by the cogging torque multiplied by the gear ratio from the wheel component 103 to PMM 200. Thus, the effective cogging resistance can thus be adjusted based on the desired resistance, which may be determined by the angle of the aircraft.

As will be apparent to one skilled in the art, other parameters of PMM 200 may be adjusted for achieving desired cogging torque and motor output values such as the number of magnetic poles, the number of stator teeth, rotor angle, etc.

Figure 3A:
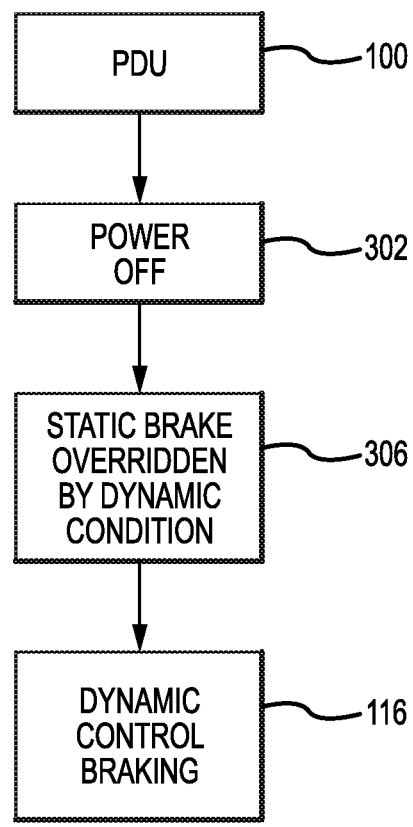
FIG. 3A is a flow chart illustrating dynamic control braking, according to various embodiments.
Figure 3B:
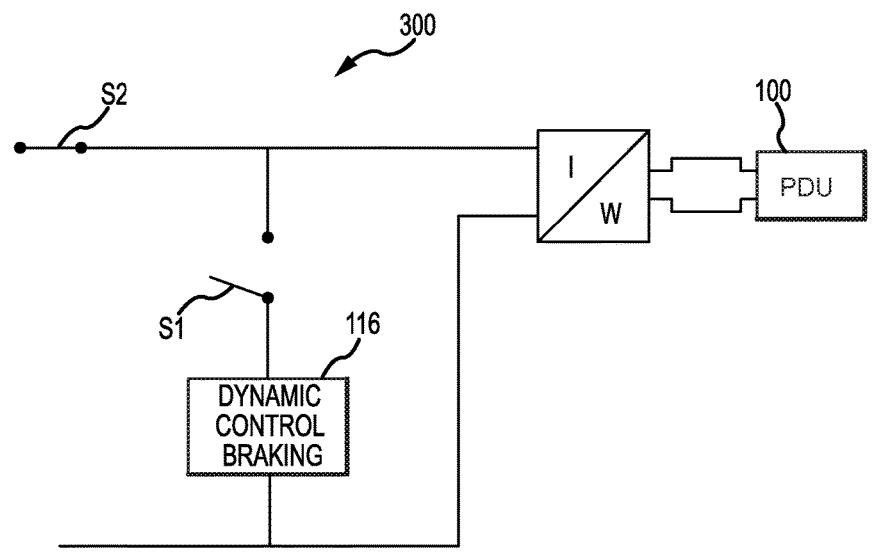
FIG. 3B shows a circuit for a power-on condition, according to various embodiments.
Figure 3C:
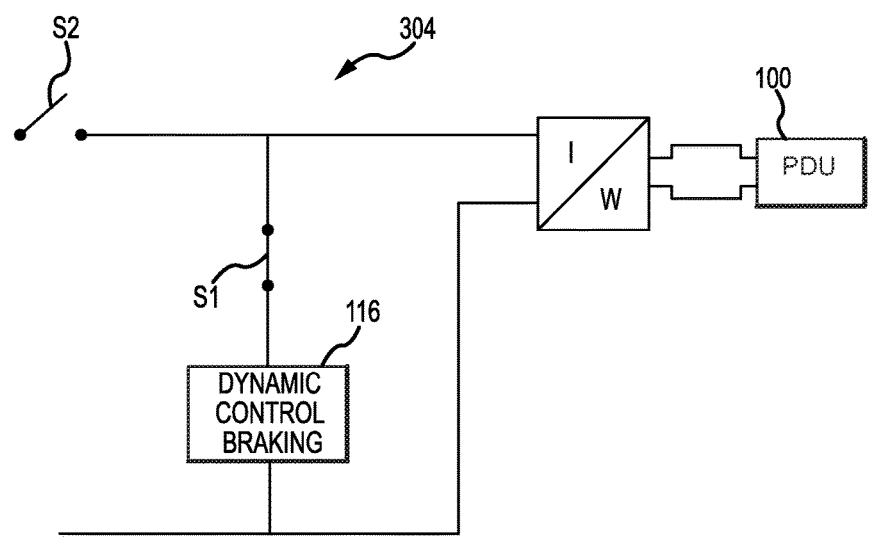
FIG. 3C shows a circuit for a power-off condition, wherein a dynamic control braking function is functional according to various embodiments.

In addition to the first braking function 110, PMM 200 also acts as a regenerative brake in order to effectuate second braking function 116 (dynamic control braking) in dynamic state 114. In dynamic state 114, cargo 107 is in motion, and first braking function 110 cannot control the motion. As illustrated in FIG. 3A, second braking function 116 is triggered in response to 1) PDU 100 switching from a power on state 300 (see FIG. 3A) to a power off state 302 (see FIG. 4B); and 2) the first braking function 110 provided by the motor cogging torque being overridden (e.g. by an operator providing manual force to move a container, a sudden loss of power while a container is in motion and/or tilting of cargo system platform 105, etc.). The triggering regenerative brake functionality occurs in response to the power supply being cut from the system (indicated by the open circuit at "S2" in FIG. 3C), and the simultaneous closing of "S1" reverses power flow (motor regeneration) from PDU 100 for activating second braking function 116.

Figure 4:
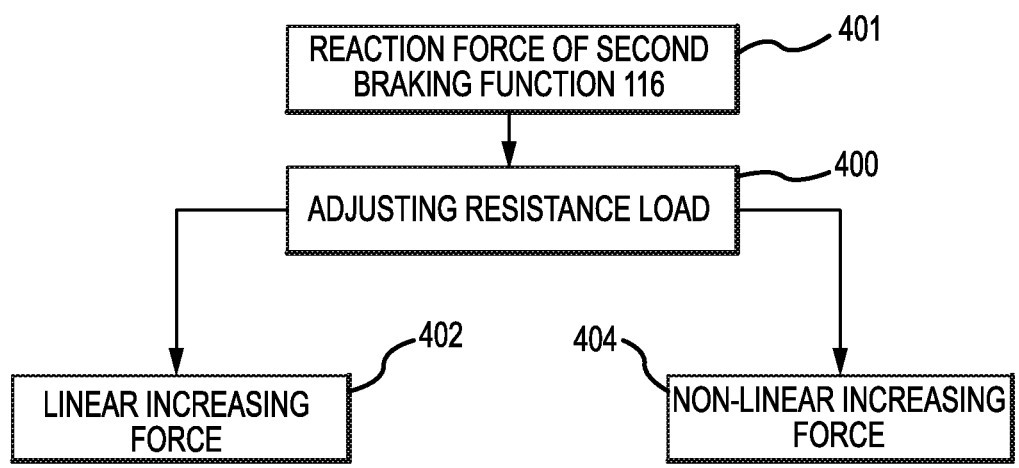
FIG. 4 is a flow chart illustrating tailoring a reaction force for dynamic control braking, according to various embodiments.

With reference to FIG. 4. according to various embodiments, the reaction force of second braking function 116 is tailored by adjusting the resistance load 400 applied at the terminals of PMM 200 to react based on the specific commands of cargo handling system 102. According to various embodiments, the reaction force 401 of second braking function 116 may be tailored to provide a linear increasing force 402 which increases linearly with container velocity, or a non-linear increasing force 404, and may preferably take into account factors such as maximum transport speed, tilt of cargo system platform 105, container weight, etc. to provide sufficient restraint for a run away container, according to various embodiments. Such resistance force may be between about 40 pounds (18.1 kg) and 65 pounds (29.4), depending on system requirements. According to various embodiments, the resistance can be tailored through the gear train of wheel component 103 to generate a fixed value at the drive wheels for a specific speed value of the motor (i.e. speed of motor overridden by a moving container).

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of retrofitting a powered transport cargo system comprising braking rollers, the method comprising:
replacing a power drive unit (PDU) of the powered transport cargo system with a PDU including a permanent magnet motor (PMM); and
removing a braking roller from the powered transport cargo system
wherein the PMM has a power drive function, a static restraint braking function, and a second dynamic control braking function and comprises a magnet component including a magnet pole arc of between approximately 120 and 160 electrical degrees.

2. The method of claim 1, further comprising replacing said braking roller with at least one of a transport roller or a cargo restraint device.

3. The method of claim 1, wherein said PMM has a cogging torque of at least 16 ounce inch.

4. The method of claim 1, wherein said PMM has an output torque of at least 76 ounce inches.

5. The method of claim 1, wherein said PMM comprises a magnet component including a magnet pole arc of approximately 140 electrical degrees.

6. The method of claim 1, wherein said PMM comprises a resistance load effectuating said dynamic control braking function.

7. The method of claim 1, wherein said dynamic control braking function comprises regenerative braking.

8. The method of claim 1, wherein said dynamic control braking function is triggered when the powered transport cargo system is in a powered off state.

9. The method of claim 1, wherein said dynamic control braking function comprises at least one of a linear increasing force or a non-linear increasing force.

* * * * *